Patented Dec. 7, 1943

2,336,359

UNITED STATES PATENT OFFICE 2,336,359

PROCESS FOR MAKING A PHENYL MERCURIC CARBOXYLIC ACID AMIDE

Morris S. Kharasch, Chicago, Ill., assignor to E. I. du Pont de Nemours & Company, Wilmington, Del., a corporation of Delaware No Drawing. Application August 21, 1941, Serial No. 407,827

5 Claims. (Cl. 260—434)

This invention relates to improved chemical processes for the preparation of aromatic mercury compounds, and more particularly to the fusion of aryl-mercuric hydroxides or organic acid salts of aryl mercuric hydroxides with acid amides to produce aromatic mercury compounds useful as disinfectants for seeds, lumber, etc. This invention also relates to certain new aromatic mercury compounds.

In accordance with the herein described invention an excellent yield of the desired aryl mercuric acid amide of a high degree of purity is easily obtained by the simple expedient of fusing an aryl mercuric hydroxide or acetate with an acid amide at temperatures from 70° to 170° C. Furthermore, I may utilize insoluble components as well as soluble derivatives as solutions are not involved. Equimolecular quantities may be used or an excess of the acid amide may be employed as a flux.

This invention has as an object a new process for the production of aromatic mercury compounds useful as seed disinfectants, fungicides, insecticides and preservatives. A further object is to prepare new aromatic mercury compounds. Other objects will appear hereinafter.

These objects are accomplished by the following invention. Equimolecular proportions of an aryl mercuric hydroxide or an organic acid salt of an aryl mercuric hydroxide and an acid amide are intimately mixed and heated until fusion takes place. Usually water begins to distill off at about 70° C., and the reaction vigorously proceeds to completion at 90–110° C. In order to lower the fusion temperature, it is often advantageous to employ an excess of the amide. The product as obtained directly from the fusion is of sufficient purity for most purposes. The compounds may be purified in the usual ways, such as by crystallization from acetone. In some cases it is expedient to remove volatile by-products by reducing the pressure on the reaction system in order to minimize side reactions.

My invention is illustrated but not limited by the following examples in which the parts are by weight.

Example I

*Phenyl mercuric acetamide.*—In a vessel equipped with means for agitation and means for external heating 20 parts of acetamide is fused by heating to 78–80° C. Then 30 parts of phenyl mercuric hydroxide is added, and the mixture heated at 102–110° C. for 1¼ hours. During this time water distills off. After cooling to room temperature the melt is ground to a powder and triturated with 200 parts of acetone in two aliquot portions at room temperature for one hour. The product is finally recovered by filtration, washed with 100 parts of acetone and dried. 25 parts of phenyl mercuric acetamide melting at 164–165° C. is obtained. The remainder of the phenyl mercuric acetamide may be recovered by evaporation of the acetone extracts.

Example II

*Phenyl mercuric acetamide.*—6.2 parts of phenyl mercuric acetate and 11 parts of acteamide are intimately mixed in an autoclave equipped with means for efficient agitation and external heating. The mixture is then heated to 55–60° C., and when fusion is completed, the pressure on the system is reduced to 20–25 mm. of mercury guage pressure. Heating is continued, and the temperature is held at 121–123° C. for 2 hours. The pressure is then increased to 40 mm. to minimize excessive sublimation, and the mixture heated at 148° C. for 2 hours. After cooling the autoclave is opened to the atmosphere and 25 parts of acetone are slowly added. The product is recovered by filtration and washed with 50 parts of acetone. In this manner 2.5 parts of crude phenyl mercuric acetamide melting at 156–160° C. is obtained. Additional product may be obtained by evaporation of the acetone extracts.

Example III

*Phenyl mercuric stearamide.*—28 parts of stearamide is melted in a vessel equipped with means for agitation by heating to 110–115° C. To this melt is added 15 parts of phenyl mercuric hydroxide, and the mixture is heated at 110–115° C. for thirty minutes and at 120–127° C. for 1½ hours. The melt is allowed to cool to room temperature and solidify. The cake is ground to a powder and extracted with 300 parts of petroleum ether. 40 parts of crude insoluble product is obtained. The crude product may be purified by digesting in 450 parts of boiling acetone, filtering and exaporating to ¼ the original volume. 16 parts of purified phenyl mercuric stearamide melting at 78–93° C. crystallizes from the acetone on chilling the solution in an ice pack.

Other aliphatic acid amides such as butyramide, caproamide, lauramide, palmitamide, etc. may be condensed with phenyl mercuric hydroxide or phenyl mercuric acetate in a similar manner to produce the corresponding phenyl mercuric acid amide in good yields and in a high state of purity. The higher molecular weight acid amides produce mercury derivatives which are soluble in oils and are advantageously used as insecticides in the form of emulsions or in non-aqueous sprays.

*Example IV*

Di-(phenyl-mercuric)-carbamide.—6 parts of urea and 15 parts of phenyl mercuric hydroxide are thoroughly mixed and heated at 100–105° C. for forty-five minutes. The mixture melts at 80–85° C. and starts to give off water. The melt after cooling to room temperature is triturated with 150 parts of acetone. 3.8 parts of crude di-(phenyl mercuric) carbamide remains undissolved. Nearly pure di-(phenyl mercuric) carbamide may be obtained by evaporating the acetone extract to dryness and triturating the residue with 100 parts of cold acetone. In this manner 3.1 parts of an insoluble fraction which by analysis is di-(phenyl-mercuric) carbamide and which melts at 135–138° C. is recovered.

*Example V*

Phenyl mercuric benzamide.—A mixture composed of 15 parts of phenyl mercuric hydroxide and 6.5 parts of benzamide is heated at 100–105° C. until completely molten, and the melt heated at 120–130° C. for four hours. After cooling to room temperature the melt is ground to a powder and extracted with 100 parts of acetone. The insoluble fraction, 9.7 parts, melts at 154–158° C. and by analysis is nearly pure phenyl mercuric benzamide.

Other aromatic acid amides such as salicylamide, naphthoic acid amide, phthalamide, etc., may also be fused with phenyl mercuric hydroxide or phenyl mercuric acetate to obtain the corresponding phenyl mercuric aromatic acid amides.

*Example VI*

Phenyl mercuric butane sulfonamide.—Sixty parts of butane sulfonamide is thoroughly mixed with 50 parts of pulverized phenyl mercuric hydroxide. The mixture is then heated at 120° C. for 4 to 5 hours. During this time the mass becomes quite fluid. The reaction mixture is allowed to cool to room temperature. The semi-crystalline solid is washed in 1200 parts of acetone to obtain a white crystalline product which is recovered by filtration. However, a major portion of the product remains in the acetone and is recovered by running the mother liquors into 4000 parts of cold water. The semi-solid product is chilled in an ice pack, filtered, and the crystals dried in a vacuum desiccator. An additional yield of product may be obtained by evaporating the aqueous acetone mother liquors under reduced pressure.

In a similar manner, the fusion of phenyl mercuric hydroxide or phenyl mercuric acetate with dodecane sulfonamide yields phenyl mercuric dodecane sulfonamide. Likewise, the alkyl sulfonamides produced by amidating the chlorsulfonation products of paraffin oils, waxes and the lighter petroleum hydrocarbons in the gasoline and kerosene ranges with sulfur dioxide and chlorine in the presence of light, undergo condensation with phenyl mercuric hydroxide or acetate to produce the corresponding phenyl mercuric alkyl sulfonamides.

The fusion of cyclohexane sulfonamide with phenyl mercuric hydroxide under essentially the same conditions and with equivalent proportions of reactants as described for phenyl mercuric butane sulfonamide gives good yields of phenyl mercuric cyclohexyl sulfonamide.

Phenyl mercuric aryl sulfonamides are produced by fusing phenyl mercuric hydroxide or phenyl mercuric acetate with aryl sulfonamides such as benzene sulfonamide, para-amino-benzene sulfonamide, hydroxy benzene sulfonamide, dimethyl benzene sulfonamide, beta-naphthyl-sulfonamide, diazo benzene-4'-sulfonamide, etc. Best results are usually obtained by using an excess of the aryl sulfonamide over that required for condensation with the phenyl mercuric hydroxide or phenyl mercuric aliphatic acid salt in order to obtain a more or less fluid reaction mixture. The temperature required is governed to some extent by the fusion point of the reaction mixture, but good results are obtained in the range 80°–100° C. However, a fluid melt is not essential as reaction takes place even in the solid state.

The invention is not limited to the use of phenyl mercuric hydroxide or its organic acid salts. Other aromatic mercury compounds such as tolyl, xylyl, mesityl, diphenyl, naphthyl, etc. mercury compounds are operable in a similar manner.

I prefer to operate in the temperature range 70° C. to 170° C., but the limits of reaction temperatures are not confined entirely to this range. However, at temperatures below 70° C. few of the reaction mixtures will produce a fluid melt and thereby introduce mechanical difficulties and react too slowly to be practical. At temperatures appreciably above 170° C. decomposition to undesirable by-products takes place at such a rate as to destroy a large portion of the organo-mercuric acid amide formed.

In a majority of the condensations I prefer to operate at atmospheric pressure as less elaborate equipment may be utilized than is required for low or high pressure operation. In some cases, as in the condensation of phenyl mercuric acetate with acetamide, it is desirable to operate at reduced pressure in order to remove a by-product (acetic acid) as it is formed in the reaction in order to minimize undesirable side reactions. In other cases super-atmospheric pressures are desirable to prevent the loss of volatile products or to accelerate the reaction.

The reaction is usually completed within an hour, many in less time and some require longer periods for the reaction to run to completion. The ideal conditions will be determined by the components in the system being operated and by the temperature. The condensations are governed by the thermodynamic principle that a higher temperature requires less time for complete reaction.

An equimolecular mixture of an aryl mercuric hydroxide or an organic acid salt thereof and an organic acid amide fuse satisfactorily in most cases, but it is often convenient to use an excess of the acid amide in order to lower the fusion point of the melt, although this expedient is not necessary. For use as disinfectants, fungicides and insecticides, the crude product is perfectly satisfactory, as the excess of acid amide present in no way affects the efficiency of the mercury derivatives. Suitable methods of purification are mentioned in the examples.

A great variety of equipment may be used to carry out the fusion, but in general a vessel equipped for agitation is preferred. The reaction vessel should be provided with adequate ventilation to reduce operating hazards, as organic mercury compounds are all more or less volatile. Reduced pressure operations may be carried out in any type of vessel having a tightly fitted cover and proper connections for vacuum.

Phenyl mercuric acid amides may be prepared from phenyl mercuric hydroxide and an acid amide in aqueous solutions. Since phenyl mercuric hydroxide is sparingly soluble in water, very large volumes are required. Furthermore, the yields of phenyl mercuric acid amides produced in this manner are very low.

I have found that through the expedient of fusing together, phenyl mercuric hydroxide or phenyl mercuric acetate with an acid amide, such as acetamide, these phenyl mercuric acid amides may be easily prepared in excellent yields in a high state of purity. For most purposes, the melt after a simple grinding operation is ready for use without further purification.

The products obtained are useful as seed disinfectants, germicides, bactericides, fungicides, insecticides, in treating lumber for various fungus organisms, such as blue stain and for therapeutic purposes in general.

Resort may be had to such modifications and variations as fall within the spirit of the invention and the scope of the appended claims.

I claim:

1. A process of making a phenyl mercuric carboxylic acid amide which comprises fusing a mixture containing phenyl mercuric hydroxide and a carboxylic acid amide that contains two hydrogen atoms directly attached to the nitrogen atom of the amido group.

2. A process as defined in claim 1 in which the carboxylic acid amide is an amide of an aliphatic carboxylic acid.

3. A process as defined in claim 1 in which the carboxylic acid amide is acetamide.

4. A process as defined in claim 1 in which the carboxylic acid amide is an amide of an aromatic carboxylic acid.

5. A process as defined in claim 1 in which the carboxylic acid amide is benzamide.

MORRIS S. KHARASCH.